(12) United States Patent
Tohyama

(10) Patent No.: US 10,014,642 B2
(45) Date of Patent: Jul. 3, 2018

(54) METHOD FOR MANUFACTURING WIRE HARNESS

(71) Applicant: Yazaki Corporation, Minato-ku, Tokyo (JP)

(72) Inventor: Eiichi Tohyama, Kosai (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 99 days.

(21) Appl. No.: 14/636,392

(22) Filed: Mar. 3, 2015

(65) Prior Publication Data

US 2015/0179311 A1 Jun. 25, 2015

Related U.S. Application Data

(63) Continuation of application No. PCT/JP2013/073432, filed on Aug. 30, 2013.

(30) Foreign Application Priority Data

Sep. 3, 2012 (JP) .................................. 2012-192837

(51) Int. Cl.
*H01R 43/20* (2006.01)
*H01B 11/18* (2006.01)
(Continued)

(52) U.S. Cl.
CPC .......... *H01R 43/20* (2013.01); *H01B 11/1808* (2013.01); *H01B 11/1834* (2013.01); *H01B 11/1869* (2013.01); *H01B 13/012* (2013.01); *H01B 13/016* (2013.01); *H01R 13/62* (2013.01); *H01R 13/622* (2013.01);
(Continued)

(58) Field of Classification Search
CPC ............ H01B 11/1808; H01B 11/1834; H01B 11/1869; H01B 13/012; H01B 13/016; H02G 3/04; H02G 3/0412; H02G 3/0462; H02G 3/0468; H02G 3/0481; H01R 13/62; H01R 13/622; H01R 13/623; H01R 43/20; H01R 43/24; B60R 16/0207; B60R 16/0215; Y10T 29/49123; Y10T 29/49194
See application file for complete search history.

(56) References Cited

U.S. PATENT DOCUMENTS 4,012,092 A 3/1977 Godbey
4,758,685 A 7/1988 Pote et al.
(Continued)

FOREIGN PATENT DOCUMENTS

DE 102008037969 A1 2/2010
EP 2450912 A 5/2012
(Continued)

OTHER PUBLICATIONS

Mar. 12, 2015—International Preliminary Report on Patentability—App PCT/JP2013/073432.
(Continued)

*Primary Examiner* — A. Dexter Tugbang
(74) *Attorney, Agent, or Firm* — Banner & Witcoff, Ltd.

(57) ABSTRACT

In a method for manufacturing a wire harness, a process in which a metallic tube body is expanded in an exterior member to be an expanded state, so that an outer surface of an insulator comes into close contact with an inner surface of the exterior member is included.

8 Claims, 7 Drawing Sheets

(51) Int. Cl.
*H02G 3/04* (2006.01)
*H01B 13/016* (2006.01)
*H01R 43/24* (2006.01)
*H01R 13/622* (2006.01)
*H01R 13/62* (2006.01)
*H01R 13/623* (2006.01)
*H01B 13/012* (2006.01)
*B60R 16/02* (2006.01)

(52) U.S. Cl.
CPC .......... *H01R 13/623* (2013.01); *H01R 43/24* (2013.01); *H02G 3/04* (2013.01); *H02G 3/0412* (2013.01); *H02G 3/0462* (2013.01); *H02G 3/0468* (2013.01); *H02G 3/0481* (2013.01); *B60R 16/0207* (2013.01); *B60R 16/0215* (2013.01); *Y10T 29/49123* (2015.01); *Y10T 29/49194* (2015.01)

(56) References Cited

U.S. PATENT DOCUMENTS

| | | | |
|---|---|---|---|
| 5,477,011 A * | 12/1995 | Singles | H01B 11/1834 174/102 R |
| 5,493,626 A | 2/1996 | Schultz et al. | |
| 5,770,257 A * | 6/1998 | Shreve | Y10T 29/49123 |
| 5,926,949 A | 7/1999 | Moe et al. | |
| 5,959,245 A | 9/1999 | Moe et al. | |
| 6,137,058 A | 10/2000 | Moe et al. | |
| 6,224,425 B1 * | 5/2001 | Shutter | H01R 43/24 |
| 6,915,564 B2 | 7/2005 | Adams | |
| 7,094,970 B2 | 8/2006 | Kihira | |
| 7,902,456 B2 | 3/2011 | Witthoft et al. | |
| 8,026,442 B2 | 9/2011 | Temblador et al. | |
| 8,410,789 B2 | 4/2013 | Koelblin et al. | |
| 9,127,110 B2 | 9/2015 | Sugita et al. | |
| 2004/0099427 A1 | 5/2004 | Kihira | |
| 2004/0118580 A1 | 6/2004 | Adams | |
| 2006/0154519 A1 * | 7/2006 | Montena | H01R 13/622 439/578 |
| 2009/0020310 A1 | 1/2009 | Witthoft et al. | |
| 2010/0314148 A1 * | 12/2010 | Temblador | H02G 3/0468 174/24 |
| 2011/0131802 A1 | 6/2011 | Witthoft et al. | |
| 2012/0103652 A1 | 5/2012 | Ooyama et al. | |
| 2015/0179311 A1 | 6/2015 | Tohyama | |

FOREIGN PATENT DOCUMENTS

| | | |
|---|---|---|
| FR | 1272966 A | 10/1961 |
| JP | S54148288 A | 11/1979 |
| JP | H03-245708 A | 11/1991 |
| JP | 10208560 A * | 8/1998 |
| JP | 2004-171952 A | 6/2004 |
| JP | 2011-014393 A | 1/2011 |
| JP | 2012-165562 A | 8/2012 |
| WO | 2004059667 A2 | 7/2004 |
| WO | 2010036586 A1 | 4/2010 |

OTHER PUBLICATIONS

May 4, 2016—U.S. Non-Final Office Action—U.S. Appl. No. 14/636,767.
Jun. 1, 2016—(EP) Extended Search Report—App 13834267.0.
Oct. 15, 2013—International Search Report—Intl App PCT/JP2013/073432.
Oct. 27, 2016—U.S. Non-Final Office Action—U.S. Appl. No. 14/636,767.
Mar. 28, 2017—U.S. Notice of Allowance—U.S. Appl. No. 14/636,767.

* cited by examiner

METHOD FOR MANUFACTURING WIRE HARNESS

CROSS REFERENCE TO RELATED APPLICATION

This application is a continuation of PCT application No. PCT/JP2013/073432, which was filed on Aug. 30, 2013 based on Japanese Patent Application (No. 2012-192837) filed on Sep. 3, 2012, the contents of which are incorporated herein by reference. Also, all the references cited herein are incorporated as a whole.

BACKGROUND OF THE INVENTION

1. Technical Field

One or more embodiments of the present invention relate to a method for manufacturing a wire harness.

2. Background Art

As a member which electrically connects, for instance, a battery to an inverter unit in a hybrid motor vehicle or an electric vehicle, a high-voltage wire harness (namely, a wire harness for high voltage) is used. In the wire harnesses which connect the above-described battery to the inverter unit, there are included two high-voltage conductive paths for a positive circuit and a negative circuit and an exterior member that protects them (see JP-A-2004-171952).

When a metal pipe (namely, the exterior member as a metallic pipe) is used which is disclosed in JP-A-2004-171952 as the exterior member, the two high-voltage conductive paths are accommodated in the metal pipe so as to be arranged.

SUMMARY OF THE INVENTION

In the above-described related-art technique, since the high-voltage conductive paths are inserted into the metal pipe, an inside diameter of the metal pipe needs to be set larger than an outside diameter of the high-voltage conductive path. Accordingly, a relatively large space is liable to be formed between an inner surface of the metal pipe and an outer surface of the high-voltage conductive path, so that the space is filled with heat generated from the high-voltage conductive paths. Accordingly, in the above-described related-art technique, heat radiation of the wire harness is not good.

Further, since the high-voltage conductive paths of the above-described related-art technique serve to transmit an electric power of a driving system, the conductive paths are thick electric wires. Accordingly, when the above-described metal pipe is used as the exterior member in the wire harness, since the two thick electric wires are accommodated in the exterior member under a state that the two thick electric wires are arranged in parallel, a diameter of the exterior member is liable to be large. When the diameter of the exterior member is large, for instance, if the wire harness is laid in the under-floor of the motor vehicle, a distance of the wire harness from the ground is apt to be short. In this case, the wire harness may possibly receive damage by stepping stones or the like.

The present invention is devised by considering the above-described circumstances and it is an object of the present invention to provide a method for manufacturing a wire harness which can improve a heat radiation and make a diameter of an exterior member small.

In order to solve the above-described problems, a wire harness and a method for manufacturing the wire harness according to the present invention are characterized by below-described (1) to (10).

(1) A wire harness including a plurality of circuits and a tube body shaped exterior member which accommodates the plurality of circuits, wherein an outermost circuit of the plurality of circuits includes a metallic tube body and an insulator provided in an outer periphery side of the metallic tube body, and the metallic tube body is expanded in the exterior member to be an expanded state, so that an outer surface of the insulator comes into close contact with an inner surface of the exterior member.

(2) A wire harness according to (1), wherein a circuit inside the outermost circuit includes a metallic tube body which is expanded and an insulator provided in an outer periphery side of the metallic tube body.

(3) A wire harness according to (1), wherein a hollow part formed in the metallic tube body is used as a circuit accommodating space.

(4) A wire harness according to (3), wherein a remaining circuit is arranged coaxially with the metallic tube body in the circuit accommodating space.

(5) A wire harness according to (3), wherein an electric wire, a cable or a shielded electric wire as the remaining circuit is inserted into the circuit accommodating space.

(6) A wire harness according to (1), wherein the circuit including the metallic tube body is a high-voltage circuit.

(7) A wire harness according to (1), wherein the metallic tube body and the insulator are formed so as to have length extended from an end of the exterior member and an end of the metallic tube body is exposed to form an electrically connecting part in the end.

(8) A wire harness according to (1), wherein the exterior member is made of metal.

(9) A wire harness according to (1), wherein the exterior member is made of resin.

(10) In a method for manufacturing a wire harness including a plurality of circuits and a tube body shaped exterior member which accommodates the plurality of circuits, wherein an outermost circuit of the plurality of circuits includes a metallic tube body and an insulator provided in an outer periphery side of the metallic tube body, the method for manufacturing the wire harness includes a process in which the metallic tube body is expanded in the exterior member to be an expanded state, so that an outer surface of the insulator comes into close contact with an inner surface of the exterior member.

Since the wire harness of the above-described (1) has the structure including the plurality of circuits, and the metallic tube body of the outermost circuit of the plurality of circuits is expanded so that the outermost circuit comes into close contact with the inner surface of the exterior member, at least the outermost circuit can be made to have a small width. Namely, according to the wire harness of the above-described (1), even when the plurality of circuits is included, the small diameter can be obtained. Further, in accordance with the small diameter of the circuit side, the exterior member which accommodates the plurality of circuits can be made to have the small diameter. Accordingly, in the present invention, for instance, the wire harness is arranged in the under-floor of the motor vehicle, the wire harness can be arranged with a distance gained from the ground (in other words, the wire harness can be arranged so as to be distant from the ground).

Further, according to the wire harness of the above-described (1), since the metallic tube body of the outermost circuit is expanded so that the outermost circuit comes into close contact with the inner surface of the exterior member, a space is not formed between the outermost circuit and the exterior member. Accordingly, the space can be prevented from being filled with heat as in the case that the space is present. As a result, the heat generated in the circuit side can be directly transmitted to the exterior member. Namely, the heat can be efficiently transmitted to the exterior member. Thus, the heat can be radiated through the exterior member, so that a heat radiation can be improved.

Further, according to the wire harness of the above-described (1), since the above-described space can be eliminated, the diameter can be more reduced. Further, according to the wire harness of the above-described (1), since the metallic tube body of the outermost circuit is expanded, a necessary sectional area of a conductor can be ensured and a thickness can be reduced. Thus, the wire harness can be easily bent. Since the thickness can be reduced to decrease a load applied to the insulator, reliability can be effectively ensured for a long period.

According to the wire harness of the above-described (2), below-described effects can be obtained as well as the effects of the wire harness of the above-described (1). Namely, since the inside circuit has the same structure as that of the outermost circuit, a space is hardly formed between the outermost circuit and the inside circuit. Thus, the space can be prevented from being filled with heat. Accordingly, the wire harness of the above-described (2) can contribute an improvement of hear radiation.

According to the wire harness of the above-described (3), below-described effects can be obtained as well as the effects of the wire harness of the above-described (1). Namely, since the hollow part of the metallic tube body which is expanded is used as the circuit accommodating space, not only the high-voltage circuit, but also other circuits may be accommodated. Accordingly, in the wire harness of the above-described (3), a high function can be achieved.

According to the wire harness of the above-described (4), below-described effects can be obtained as well as the effects of the wire harness of the above-described (3). Namely, the wire harness has the structure that the remaining circuit is arranged coaxially with the metallic tube body in the circuit accommodating space. Specifically, since the wire harness has the structure that all the plurality of circuits are coaxially arranged, a width can be made to be smaller than a width obtained, for instance, when a plurality of thick electric wires (namely, conductive paths.) are arranged. Accordingly, in the wire harness of the above-described (4), the diameter can be made small.

According to the wire harness of the above-described (5), below-described effects can be obtained as well as the effects of the wire harness of the above-described (3). Namely, since the wire harness has the structure that the electric wire, the cable or the shielded electric wire as the remaining circuit is inserted into the circuit accommodating space, when at least the outermost circuit is allowed to have the small width, the wire harnesses having various kinds of circuit structures can be provided.

According to the wire harness of the above-described (6), below-described effects can be obtained as well as the effects of the wire harness of the above-described (1). Namely, since the wire harness has the structure that the circuit including the metallic tube body is the high-voltage circuit, a high-voltage wire harness can be provided.

According to the wire harness of the above-described (7), below-described effects can be obtained as well as the effects of the wire harness of the above-described (1). Namely, since the end of the metallic tube body of the metallic tube body and the insulator which are extended from the end of the exterior member is exposed to form the electrically connecting part in the end, a connection to an external part can be made through the electrically connecting part. Further, since the electrically connecting part is arranged so as to be separated from the end of the exterior member, an electric connection property can be sufficiently ensured.

According to the wire harness of the above-described (8), below-described effects can be obtained as well as the effects of the wire harness of the above-described (1). Namely, since the exterior member is made of the metal, a protecting function for, for instance, stepping stones can be improved. Further, the exterior member may exhibit a shielding function.

According to the wire harness of the above-described (9), below-described effects can be obtained as well as the effects of the wire harness of the above-described (1). Namely, since the exterior member is made of resin, a necessary and sufficient strength can be ensured and a small weight can be achieved.

According to the method for manufacturing the wire harness of the above-described (10), can be manufactured the wire harness having the structure that the plurality of circuits are included and the metallic tube body of the outermost circuit of the plurality of circuits is expanded to be an expanded state so that the outermost circuit comes into close contact with the inner surface of the exterior member.

DETAILED DESCRIPTION OF THE EXEMPLARY EMBODIMENTS

A wire harness according to the present embodiment includes a high-voltage coaxial compound conductive path and an exterior member which accommodates the high-voltage coaxial compound conductive path. Further, the high-voltage coaxial compound conductive path is formed so as to have one electric wire by coaxially arranging circuits of two systems (two circuits), circuits of three systems (three circuits), circuits of four systems (four circuits), . . . , or circuits of n systems (n circuits).

Specifically, the high-voltage coaxial compound conductive path has, at its center, a first conductive path and a first insulator with which an outer periphery of the first conductive path is coated. Further, the high-voltage coaxial compound conductive path has a second conductive path arranged outside the first insulator and a second insulator with which an outer periphery of the second conductive path is coated. In such a way, the high-voltage coaxial compound conductive path is formed in such a way that the circuits of the two systems are coaxially arranged to have one body. Further, the high-voltage coaxial compound conductive path may be formed in such a way that a third conductive path and a third insulator are further provided outside the second insulator so that the circuits of the three systems are coaxially arranged to have one body. Further, the high-voltage coaxial compound conductive path may be formed in such a way that a fourth conductive path and a fourth insulator are further provided outside them to obtain the circuits of the four systems, further, an nth conductive path and an nth insulator are further provided outside them so that the circuits of the n systems are coaxially arranged to have one body.

In the high-voltage coaxial compound conductive path, the outermost circuit of the plurality of circuits is formed with a metallic tube body. The metallic tube body is expanded in the exterior member so that the tube body is formed in an expanded state. Thus, an outer surface of the insulator included in the outermost circuit comes into close contact with an inner surface of the exterior member.

First Embodiment

Figure 1:
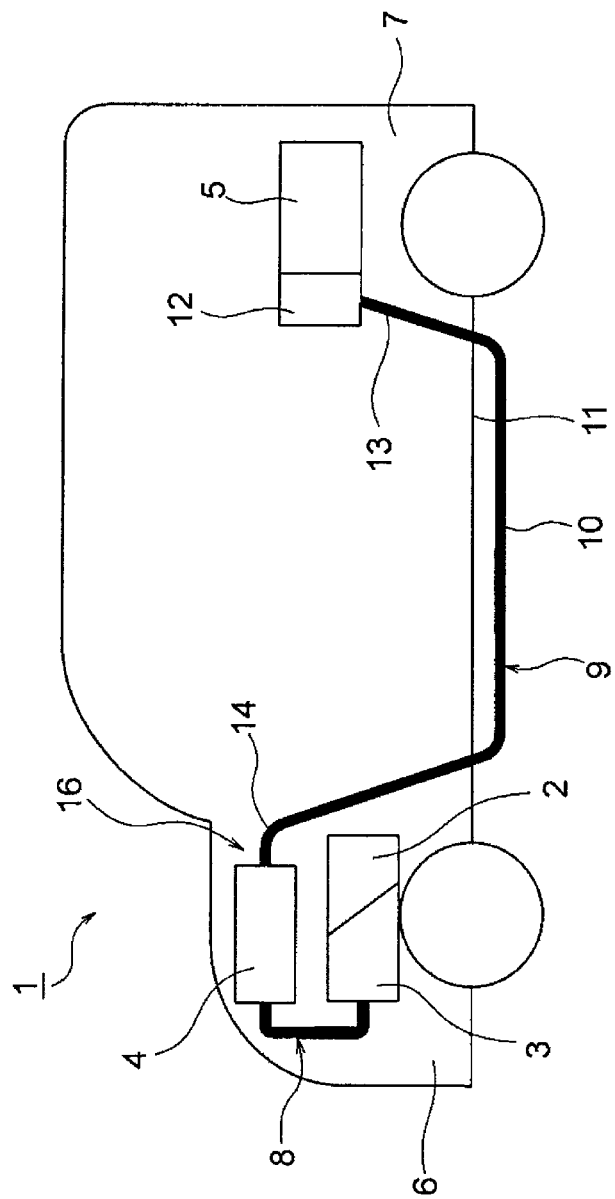
FIG. 1 is a schematic view of a motor vehicle showing a state that a wire harness is arranged.
Figure 2:
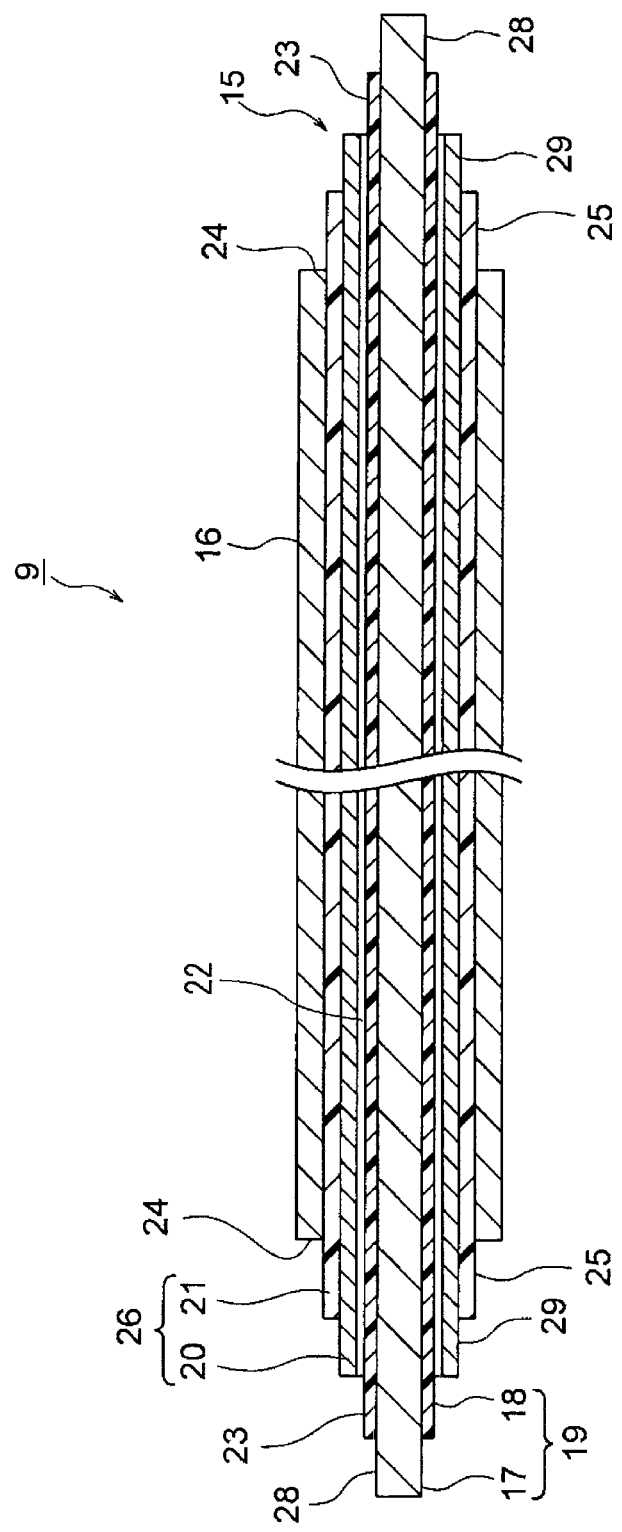
FIG. 2 is a longitudinally sectional view showing a structure of the wire harness.
Figure 3:
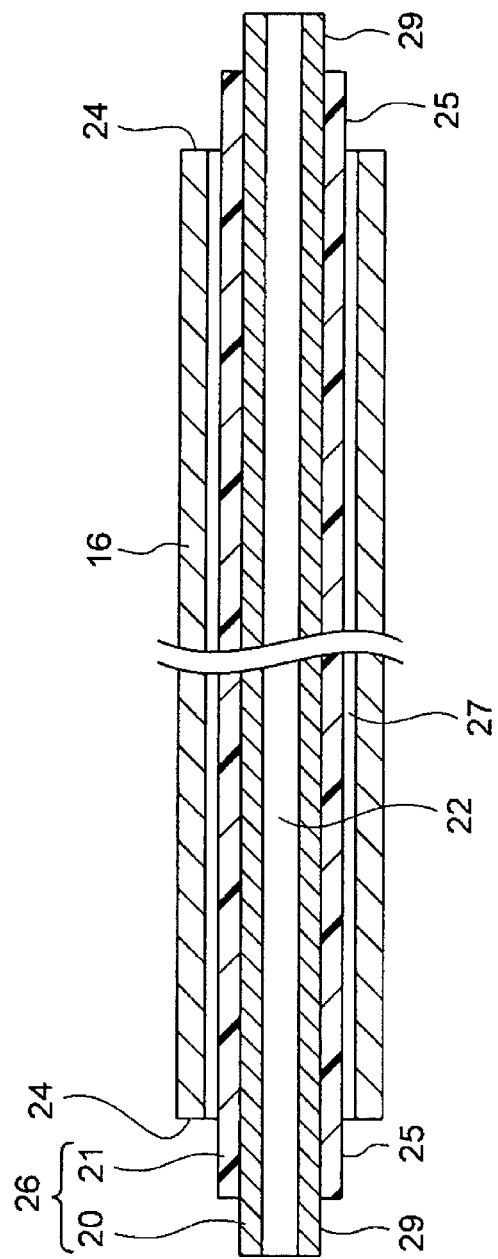
FIG. 3 is a longitudinally sectional view showing a manufacturing process of the wire harness and showing a first process.
Figure 4:
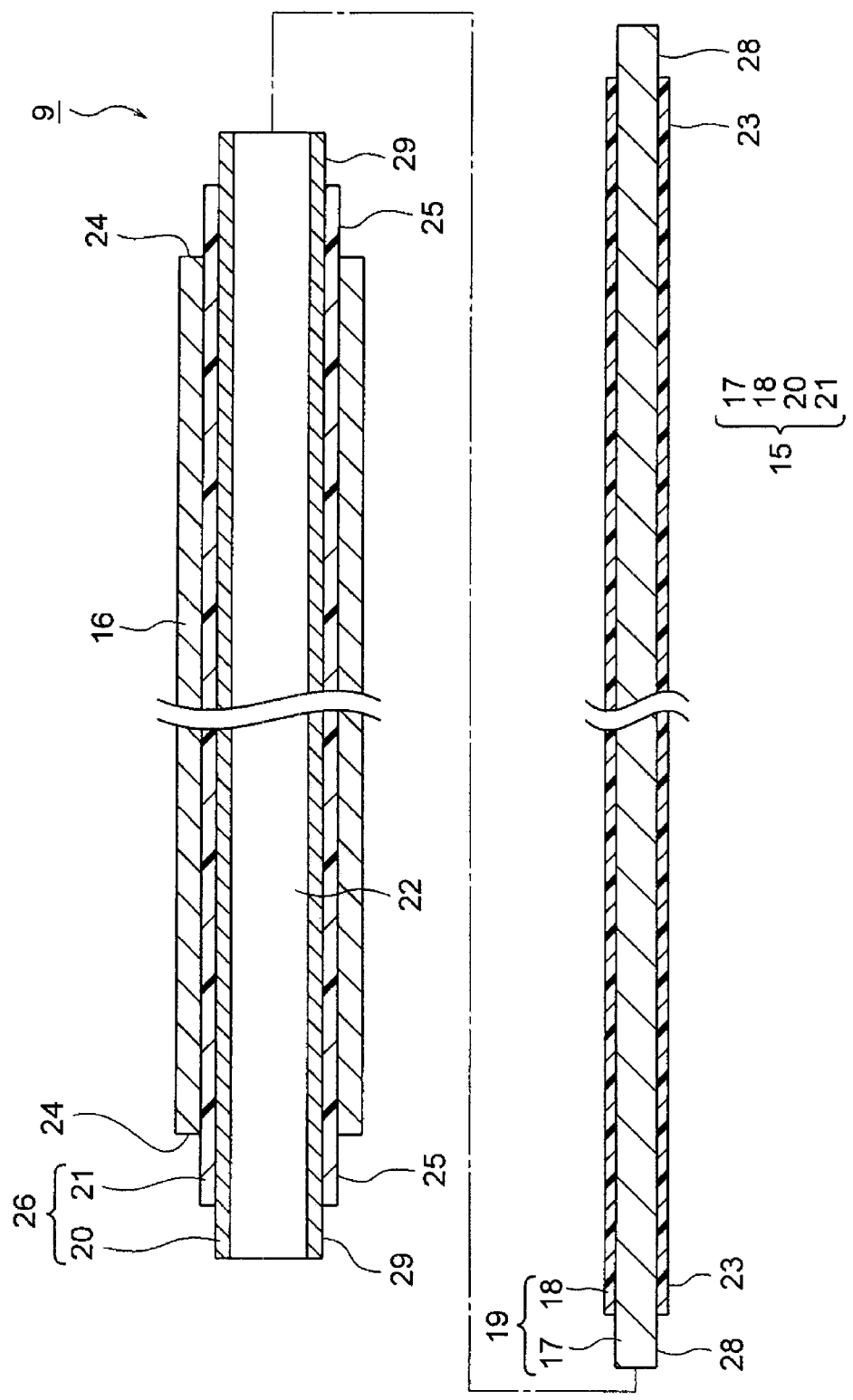
FIG. 4 is a longitudinally sectional view showing a manufacturing process of the wire harness and showing a second process and a third process.

Now, by referring to FIG. 1 to FIG. 4, a first embodiment of the wire harness according to the present invention will be described below. FIG. 1 is a schematic view of a motor vehicle showing a state that the wire harness is arranged. FIG. 2 is a longitudinally sectional view showing a structure of the wire harness. FIG. 3 and FIG. 4 are longitudinally sectional views showing manufacturing processes of the wire harness.

In the first embodiment, an example is exemplified and described that the wire harness of the first embodiment is arranged in a hybrid motor vehicle (an electric vehicle or an ordinary motor vehicle may be used).

In FIG. 1, reference numeral 1 designates the hybrid motor vehicle. The hybrid motor vehicle 1 is a vehicle driven by mixing two powers of an engine 2 and a motor unit 3. To the motor unit 3, an electric power from a battery 5 (in other words, a battery pack) is supplied through an inverter unit 4. The engine 2, the motor unit 3 and the inverter unit 4 are mounted on an engine room 6 at a position near front wheels in this example. Further, the battery 5 is mounted on a rear part 7 of the motor vehicle near rear wheels. The battery 5 may be mounted in an interior of the motor vehicle located in a rear part of the engine room 6.

The motor unit 3 is electrically connected to the inverter unit 4 by a wire harness 8 for high voltage. Further, the battery 5 is electrically connected to the inverter unit 4 by a wire harness 9 for high voltage. The wire harness 9 has its intermediate part 10 arranged in an under-floor 11 of the vehicle. Further, the wire harness 9 is arranged substantially in parallel along the under-floor 11 of the vehicle. The under-floor 11 of the vehicle is a known body and what is called a panel member and has a through hole (not shown in the drawing) formed at a prescribed position. The wire harness 9 is inserted into the through hole.

The wire harness 9 is electrically connected to the battery 5 through a junction block 12 provided in the battery 5. To the junction block 12, a rear end 13 of the wire harness 9 is electrically connected by a known method. A front end 14 side of the wire harness 9 is electrically connected to the inverter unit 4 by a known method.

The motor unit 3 includes a motor (not shown in the drawing) and a generator (not shown in the drawing). Further, the inverter unit 4 includes an inverter (not shown in the drawing) and a converter (not shown in the drawing). The motor unit 3 is formed as a motor assembly including a shield case (not shown in the drawing). Further, the inverter unit 4 is also formed as an inverter assembly including a shield case (not shown in the drawing). The battery 5 is an Ni-MH type or an Li-ion type and formed as a module. For instance, a storage battery such as a capacitor may be used. When the battery 5 can be used for the hybrid motor vehicle 1 or the electric vehicle, the battery 5 is not specially limited.

A composition and a structure of the wire harness 9 will be described. The wire harness 9 is, as described above, a member for the high-voltage or the high voltage to electrically connect the inverter unit 4 to the battery 5. As shown in FIG. 2, the wire harness 9 includes a high-voltage coaxial compound conductive path 15, an exterior member 16 and an electromagnetic shielding member (not shown in the drawing).

The high-voltage coaxial compound conductive path 15 includes a high-voltage electric wire 19 having a positive-electrode conductor 17 and a first insulator 18, a pipe shaped negative-electrode conductor 20 provided so as to cover an outer periphery of the high-voltage electric wire 19 and a second insulator 21 with which the negative-electrode conductor 20 is coated.

The positive-electrode conductor 17 is provided to form an inner circuit (A positive circuit. A first conductive path.). Further, the negative-electrode conductor 20 is provided to form an outer circuit (A negative circuit. A second conductive path corresponding to a below-described outer circuit 26.). Positive and negative of the positive-electrode conductor 17 and the negative-electrode conductor 20 may be reversed.

As the positive-electrode conductor 17, there are exemplified a structure having a stranded wire conductor or a conductor structure having, for instance, a round rod wire (namely, a conductor structure having a round single core.), a square rod wire (namely, a conductor structure having a square single core) and a conductor structure having a pipe form or a bus bar form. In the first embodiment, as the positive-electrode conductor 17, the structure of the stranded wire conductor is used. A material of the positive-electrode conductor 17 is not especially limited. However, exemplified is aluminum, aluminum alloy, copper or copper alloy. In the first embodiment, as the material of the positive-electrode conductor 17, the positive-electrode conductor made of aluminum or aluminum alloy is used.

The first insulator 18 is a sheath cover to the positive-electrode conductor 17 and formed by carrying out an extrusion molding of known resin material.

The above-described high-voltage electric wire 19 is accommodated in a hollow part 22 as a space defined in the negative-electrode conductor 20. The hollow part 22 is used as a circuit accommodating space. The high-voltage electric wire 19 comes into contact with an inner surface of the negative-electrode conductor 20, so that heat generated in the high-voltage electric wire itself can be absorbed by the negative-electrode conductor 20. The negative-electrode conductor 20 can distribute the absorbed heat and transmit the heat to the exterior member 16 (a detail will be described below.).

As the negative-electrode conductor 20, a metallic pipe which is circular in section (namely, a metallic tube body) is used, which may be expanded as described below. The negative-electrode conductor 20 is formed so that a sectional form meets a sectional form of the exterior member 16. The negative-electrode conductor 20 is formed so as to have an inside diameter into which the high-voltage electric wire 19 can be inserted and accommodated after a below-described pipe expansion is carried out. Further, the negative-electrode conductor 20 is formed to have a length so that the high-voltage electric wire 19 can be inserted and accommodated with an end part 23 of the high-voltage electric wire 19 left.

The negative-electrode conductor 20 is formed so as to have a size the same as or larger than a size of the positive-electrode conductor 17 (namely, a sectional area of the conductor). Namely, for instance, when the size of the positive-electrode conductor 17 is 15 sq, the negative-electrode conductor 20 is formed so as to have the size of 15 sq or more, so that an electric stability can be advantageously improved. The negative-electrode conductor 20 is set so that the sectional area of the conductor meets the sectional area of the conductor of the positive-electrode conductor 17. Accordingly, even in a metal pipe, a thickness is not large (in other words, thick). It is to be understood that the metal pipe is exceptionally thin and has a small diameter as compared with the usual metal pipe used as the exterior member. Since the negative-electrode conductor 20 is formed so that the metal pipe is expanded as described below, the thickness of the negative-electrode conductor is more reduced.

A quality of material (a material) of the negative-electrode conductor 20 is selected by considering a quality of material (a material) or a cost of the positive-electrode conductor 17. In the first embodiment, as the material of the negative-electrode conductor 20, copper is selected. The present invention is not limited thereto and aluminum or aluminum alloy or copper alloy (brass) may be selected.

The second insulator 21 is a sheath cover to the negative-electrode conductor 20 and formed by an extrusion molding or an application by the use of known resin material or winding an insulating tape. For the second insulator 21, an expansible (in other words, extensible) material is used due to the below-described pipe expansion of the negative-electrode conductor 20. The second insulator 21 is provided so as to cover an outer surface of the negative-electrode conductor 20.

The above-described negative-electrode conductor 20 and the second insulator 21 form the below-described outer circuit 26.

As the exterior member 16, a pipe (namely, a tube body) which is circular in section is employed. Further, as the exterior member 16, a metallic member is used in the first embodiment. The exterior member 16 is not limited to the metallic exterior member and may be made of resin. The exterior member 16 is formed to have such length as to expose an end part 25 of the negative-electrode conductor 20 and the second insulator 21 in the high-voltage coaxial compound conductive path 15 with a prescribed length from its end 24. With an inner surface of the exterior member 16, an outer surface of the high-voltage coaxial compound conductive path 15 after the below-described pipe expansion comes into close contact.

The exterior member 16 is formed so as to be circular in section in the first embodiment as described above. However, the exterior member 16 may be configured so as to have an elliptic form, an oval form or a substantially rectangular form in section. Such an exterior member 16 is provided to form a path of the wire harness 9 and a bending work is applied to an arranged path.

A quality of material (a material) of the exterior member 16 is selected by considering the formation of the above-described path or a protection of the high-voltage coaxial compound conductive path 15 and further a heat radiation. In the first embodiment, as the material of the exterior member 16, aluminum or aluminum alloy is selected. The material of the exterior member 16 is not limited thereto and copper or copper alloy (brass) may be used. When the copper or the copper alloy is selected, a rust preventive coating is preferably applied to an outer surface thereof.

Since the exterior member 16 accommodates the high-voltage coaxial compound conductive path 15, a dimension of an outside diameter is set to be relatively small.

Now, in accordance with the above-described composition and the structure, manufacturing processes of the wire harness 9 will be described below. The wire harness 9 is manufactured to a state as shown in FIG. 2 via a first process shown in FIG. 3 and a second process and a third process shown in FIG. 4 in order.

In FIG. 3, in the first process, a work is carried out in which the second insulator 21 is previously provided in an outer surface of the negative-electrode conductor 20 to manufacture the outer circuit 26 by the extrusion molding. The outer circuit 26 is manufactured under a straight state. In the first embodiment, the inside diameter of the negative-electrode conductor 20 is smaller than an outside diameter of the high-voltage electric wire 19. Accordingly, the outer circuit 26 is formed so as to have a small diameter.

Further, in the first process, a work is carried out in which the exterior member 16 in a straight state is cut to a prescribed length and a necessary work is applied. The necessary work indicates a work relating to a process of an edge generated in, for instance, the end 24 of the exterior member 16.

Further, in the first process, a work is carried out in which the outer circuit 26 is accommodated in a hollow part 27 as an inner part of the exterior member 16. From the end 24 of the exterior member 16, the end part 25 of the outer circuit 26 (specifically, the negative-electrode conductor 20 and the second insulator 21) is extended with a prescribed length.

In FIG. 4, in the second process, a work is carried out in which the negative-electrode conductor 20 in the outer circuit 26 is expanded outside over an entire periphery to be an expanded state. Thus, an outer surface of the outer circuit 26, namely, the outer surface of the second insulator 21 comes into close contact with the inner surface of the exterior member 16. The negative-electrode conductor 20 has the inside diameter enlarged via the second process. The inside diameter of the negative-electrode conductor 20 is preferably a little larger than an outside diameter of the high-voltage electric wire 19. As described above, a method for manufacturing the wire harness 9 of the first embodiment includes the process in which the negative-electrode conductor 20 as the metallic tube body is expanded in the exterior member 16 to be the expanded state, so that the outer surface of the second insulator 21 is allowed to come into close contact with the inner surface of the exterior member 16.

As a working method in which the pipe is allowed to be the expanded state, for instance, a method is exemplified as one example in which a die of a prescribed size is inserted into the hollow part 22 of the negative-electrode conductor 20 to expand the pipe.

In the third process, a work is carried out in which the high-voltage electric wire 19 is inserted and accommodated in the hollow part 22 of the expanded negative-electrode conductor 20. When the high-voltage electric wire 19 is completely inserted and accommodated, the wire harness 9 is completed as shown in FIG. 2. To the wire harness 9, the bending work is applied so as to meet the arranged path by using, for instance, a bending machine not shown in the drawing after the third process.

An end of the wire harness 9 is worked so that a prescribed length of the first insulator 18 is removed so as to expose an end of the positive-electrode conductor 17. The end exposed part of the positive-electrode conductor 17 is formed as an electrically connecting part 28. Since the electrically connecting part 28 is arranged so as to be separated from the end 24 of the exterior member 26, an electric connection property can be sufficiently ensured. To the electrically connecting part 28, a terminal fitting (not shown in the drawing) is attached.

Further, the second insulator 21 is also worked so that a prescribed length of the second insulator 21 is removed so as to expose an end of the negative-electrode conductor 20. The end exposed part of the negative-electrode conductor 20 is formed as an electrically connecting part 29. Since the electrically connecting part 29 is arranged so as to be separated from the end 24 of the exterior member 16, an electric connection property can be sufficiently ensured. To the electrically connecting part 29, a terminal fitting (not shown in the drawing) is attached.

As described above by referring to FIG. 1 to FIG. 4, the wire harness 9 has the structure that the outer surface of the high-voltage coaxial compound conductive path 15, namely, the outer surface of the second insulator 21 comes into close contact with the inner surface of the exterior member 16. Accordingly, a space is not formed between the outer surface of the second insulator 21 and the inner surface of the exterior member 16. Thus, the space can be prevented from being filled with the heat, as in the case that there is the space. As a result, the heat generated in the high-voltage coaxial compound conductive path 15 can be directly transmitted to the exterior member 16. Therefore, in the wire harness 9, an efficient heat radiation can be obtained as compared with a conventional technique.

Further, since the wire harness 9 includes the high-voltage coaxial compound conductive path 15 and the high-voltage coaxial compound conductive path 15 has the plurality of circuits arranged coaxially, a diameter of the conductive path itself can be more reduced than a usual conductive path. Since the diameter of the conductive path can be reduced, a diameter of the exterior member 16 which accommodates the high-voltage coaxial compound conductive path 15 having the small diameter can be also reduced. Accordingly, when the wire harness 9 is arranged in the under-floor 11 of the vehicle, the wire harness 9 can be arranged with a distance gained from the ground.

Second Embodiment

Figure 5:
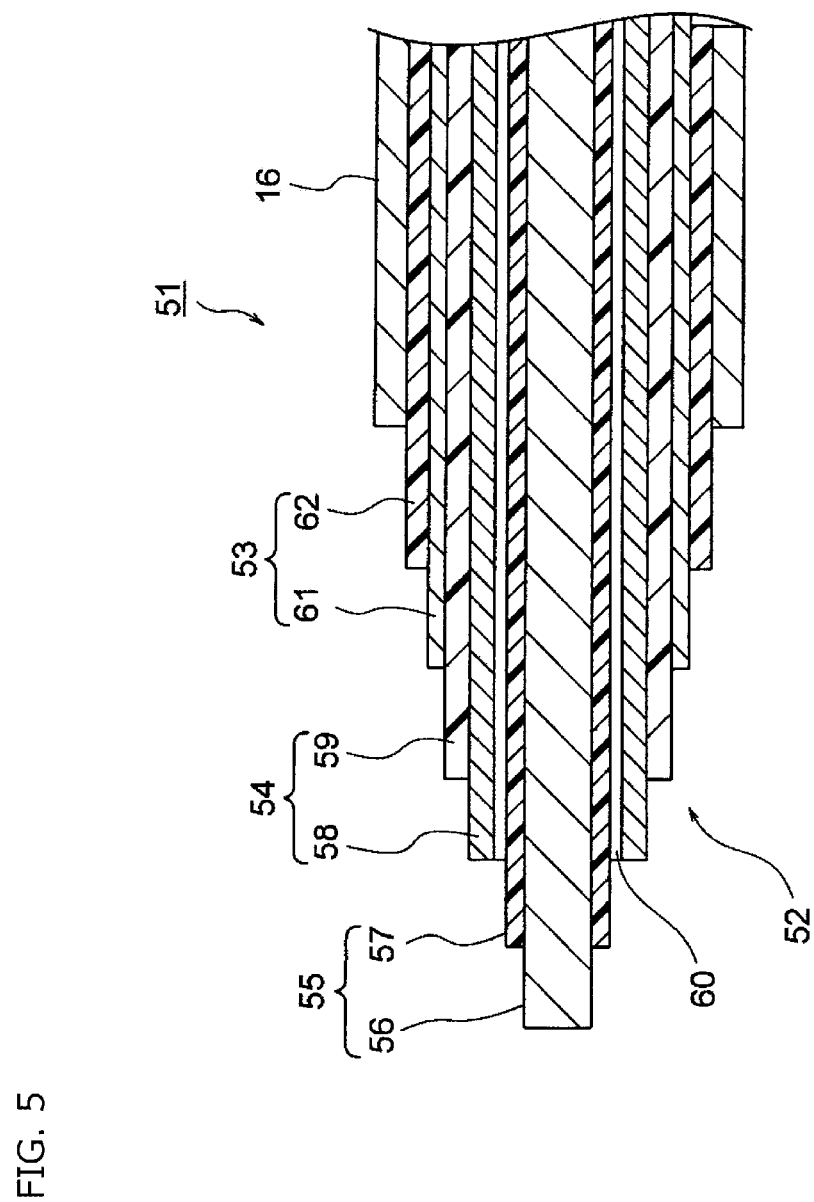
FIG. 5 is a longitudinally sectional view showing a structure of a wire harness according to a second embodiment.

Now, by referring to FIG. 5, a second embodiment will be described below. FIG. 5 is a longitudinally sectional view showing a structure of a wire harness according to the second embodiment. Component members which are basically the same as those of the first embodiment are designated by the same reference numerals and a detailed description thereof will be omitted.

In FIG. 5, a wire harness 51 of the second embodiment shows another example to the wire harness 9 of the first embodiment and is arranged in the same manner as that of the first embodiment. The wire harness 51 includes a high-voltage coaxial compound conductive path 52, an exterior member 16 and an electromagnetic shielding member (not shown in the drawing).

The high-voltage coaxial compound conductive path 52 is formed in such a way that circuits of three systems (three circuits) are coaxially put together to have one body. Specifically, the high-voltage coaxial compound conductive path 52 is formed by coaxially collecting an outer circuit 53 (an outer circuit) and inner circuits 54 and 55 (inside circuits) arranged inside the outer circuit 53 so as to have one body.

As the inner circuit 55 located in an innermost side, a high-voltage electric wire is used which includes a conductor 56 and an insulator 57. The inner circuit 55 may be formed with a below-described metallic tube body and an insulator like the outer circuit 53 and the inner circuit 54. In the second embodiment, the conductor 56 is a first conductive path and the insulator 57 is a first insulator.

The inner circuit 54 is a circuit located between the above-described inner circuit 55 and the outer circuit 53, an includes a metallic tube body 58 expansible and having a circular section (namely, a metallic pipe) and an insulator 59 which covers an outer surface of the metallic tube body 58. The inner circuit 54 is expanded outside over an entire periphery to have the pipe expanded. An outer surface of the insulator 59 comes into close contact with an inner surface of a below-described metallic tube body 61 of the outer circuit 53. In a hollow part 60 of the expanded metallic tube body 58, the inner circuit 55 is inserted. In the second embodiment, the metallic tube body 58 is a second conductive path and the insulator 59 is a second insulator.

The outer circuit 53 is a circuit located in an outermost side and includes a metallic tube body 61 expansible and having a circular section (namely, a metallic pipe) and an insulator 62 which covers an outer surface of the metallic tube body 61. The outer circuit 53 is expanded outside over an entire periphery to have the pipe expanded. An outer surface of the insulator 62 comes into close contact with an inner surface of the exterior member 16. In a hollow part (not shown in the drawing) of the expanded metallic tube body 61, the inner circuit 54 is inserted. After that, the inner circuit 54 is expanded as described above. In the second embodiment, the metallic tube body 61 is a third conductive path and the insulator 62 is a third insulator.

As can be understood from the above-described composition and the structure, it is to be understood that the wire harness 51 of the second embodiment exhibits the same effects as those of the first embodiment.

Third Embodiment

Now, a third embodiment will be described below. The third embodiment, which is not especially shown in the drawing, is changed relative to the second embodiment in view of a below-described point.

Namely, in a wire harness (not shown in the drawing) according to the third embodiment, other conductive path (it is not limited to a high-voltage conductive path) is inserted in place of the inner circuit 55 located in the innermost side. As one example of the inner circuit 55, may be exemplified a low-voltage shielded electric wire.

Fourth Embodiment

Figure 6:
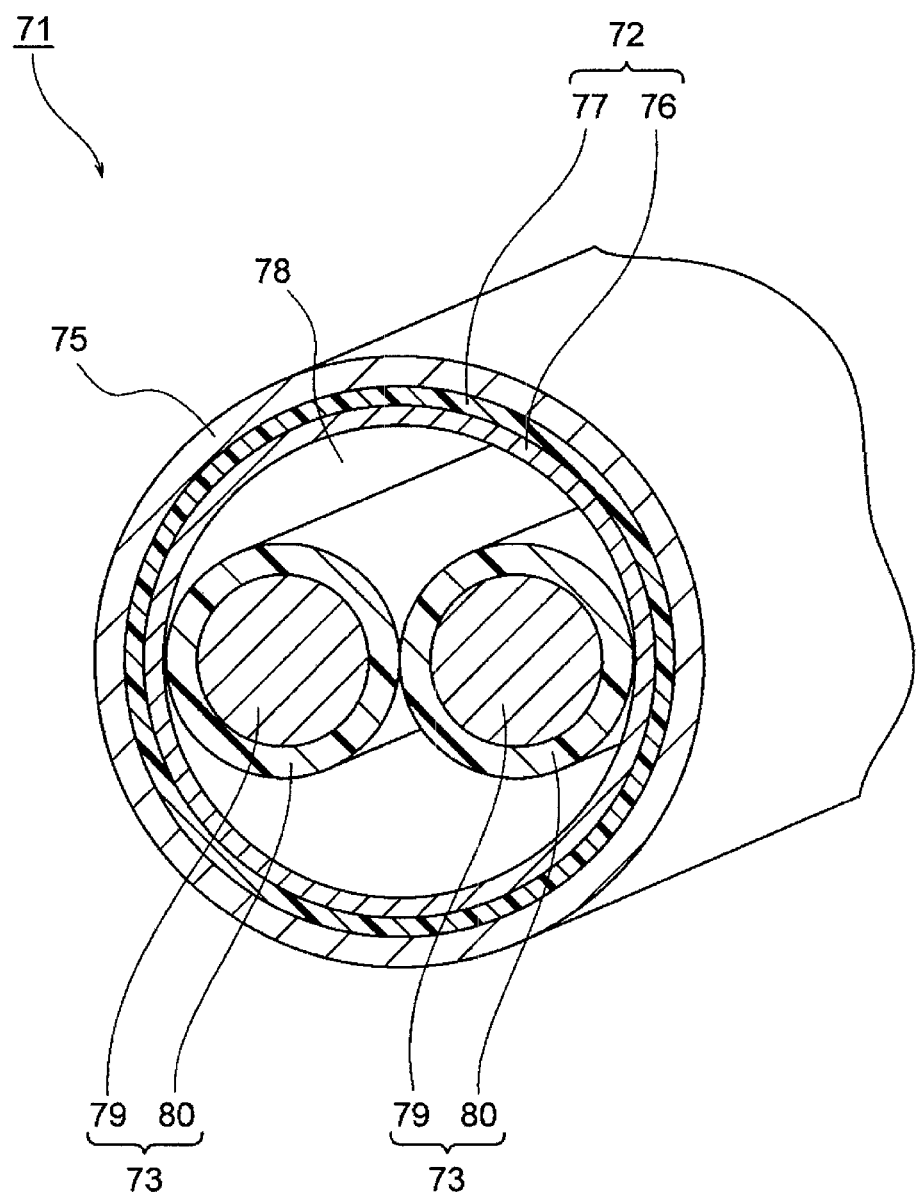
FIG. 6 is a sectional perspective view showing a structure of a wire harness according to a fourth embodiment.

Now, referring to FIG. 6, a fourth embodiment will be described below. FIG. 6 is a sectional perspective view showing a structure of a wire harness according to the fourth embodiment.

In FIG. 6, the wire harness 71 of the fourth embodiment includes a plurality of circuits having an outer circuit 72 (an outer circuit) and two inner circuits 73 (inside circuits) and a tube shaped exterior member 75 which accommodates the plurality of circuits and an electromagnetic shielding member (not shown in the drawing.).

The outer circuit 72 is a high-voltage circuit located in an outermost side and includes a metallic tube body 76 expansible and having a circular section (namely, a metallic pipe) and an insulator 77 which covers an outer surface of the metallic tube body 76. The outer circuit 72 is expanded outside over an entire periphery to have the pipe expanded. An outer surface of the insulator 77 comes into close contact with an inner surface of the exterior member 75. In a hollow part 78 of the expanded metallic tube body 76, the two inner circuit 73 are inserted. The two inner circuits 73 are respectively the same, and known high-voltage electric wires are used which respectively include conductors 79 and insulators 80.

The plurality of circuits including the outer circuit 72 and the two inner circuits 73 are used as, for instance, a three-phase alternating current circuit.

As can be understood from the above-described composition and the structure, it is to be understood that the wire harness 71 of the fourth embodiment also exhibits the same effects as those of the first embodiment.

The outer circuit 72 and the exterior member 75 are circular in section in the second embodiment, however, the present invention is not limited thereto. Namely, they may be configured as elliptic forms or oval forms so as to meet the arrangement of the two inner circuits 73.

In addition thereto, the electromagnetic shielding member may be included in the structures of the plurality of circuits or corresponded to the exterior member 75 itself.

Fifth Embodiment

Figure 7:
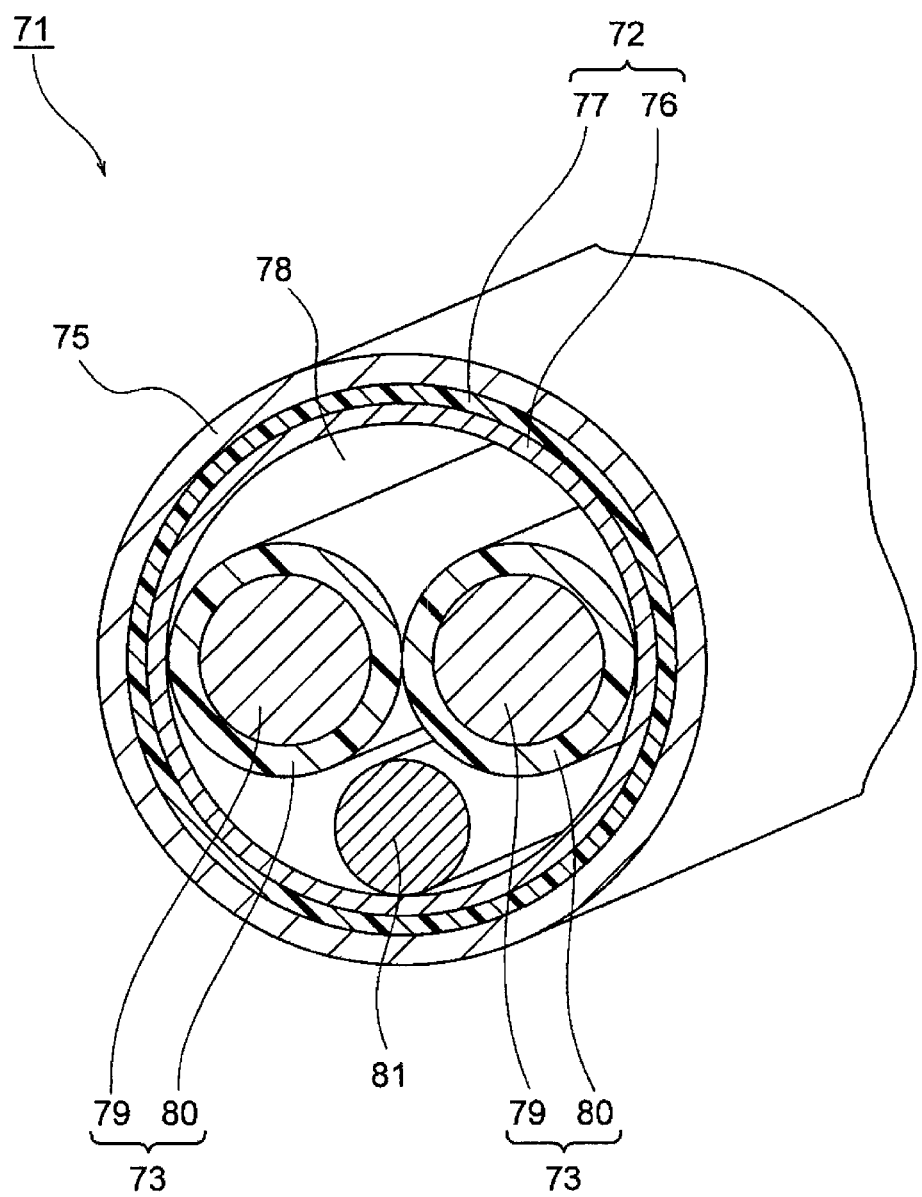
FIG. 7 is a sectional perspective view showing a structure of a wire harness according to a fifth embodiment.

Now, referring to FIG. 7, a fifth embodiment will be described below. FIG. 7 is a sectional perspective view showing a structure of a wire harness according to the fifth embodiment. Component members which are basically the same as those of the fourth embodiment are designated by the same reference numerals and a detailed description thereof will be omitted.

In FIG. 7, the wire harness 71' of the fifth embodiment is formed by adding a low-voltage shielded electric wire 81 to the wire harness 71 of the fourth embodiment. The shielded electric wire 81 has a known composition and a structure. In a hollow part 78 of an expanded metallic tube body 76, the shielded electric wire 81 is inserted like two inner circuits 73. The number shown in FIG. 7 indicates one example, and the number of the shielded electric wire 81 is not limited thereto. The wire harness 71' of the fifth embodiment includes a plurality of circuits having an outer circuit 72, the two inner circuits 73 and the shielded electric wire 81.

According to the fourth and fifth embodiments, when at least the outer circuit 72 is allowed to have a small width, the wire harnesses 71 and 71' having various kinds of circuit structures can be provided.

In addition thereto, it is to be understood that the present invention may be variously changed within a range which does not change the gist of the present invention.

Now, the wire harnesses 9, 51, 71 and 71' of the embodiments and a method for manufacturing the wire harnesses will be summarized below.

(1) The wire harness 9, 51, 71, 71' includes a plurality of circuits (the high-voltage coaxial compound electric conductive path 15 (specifically, the outer circuit 26 and the high-voltage electric wire 19), the high-voltage coaxial compound conductive path 52 (specifically, the outer circuit 53, the inner circuits 54 and 55)) and the tube body shaped exterior member 16 which accommodates the plurality of circuits. The outermost circuit of the plurality of circuits (the outer circuit 26, 53, 72) includes the metallic tube body (the negative-electrode conductor 20, the metallic tube body 58, 61, 76) and the insulator provided in the outer periphery side of the metallic tube body (the second insulator 21, the insulator 59, 62, 77). The metallic tube body is expanded in the exterior member 16 to be the expanded state. Thus, the outer surface of the insulator comes into close contact with the inner surface of the exterior member 16.

(2) In the wire harness 9, 51, 71, 71', the circuit more inside (the high-voltage electric wire 19, the inner circuit 54, 55, 73) the outermost circuit (the outer circuit 26, 53, 72) includes the metallic tube body (the negative-electrode conductor 20, the metallic tube body 58, 61, 76) which is expanded and the insulator (the second insulator 21, the insulator 59, 62, 77) provided in the outer periphery side of the metallic tube body.

(3) In the wire harness 9, 51, 71, 71', the hollow part 22, 60, 78 formed in the metallic tube body (the negative-electrode conductor 20, the metallic tube body 58, 61, 76) is used as a circuit accommodating space.

(4) In the wire harness 9, 51, a remaining circuit is arranged coaxially with the metallic tube body (the negative-electrode conductor 20, the metallic tube body 58) in the circuit accommodating space (the hollow part 22, 60).

(5) In the wire harness 71, 71', into the circuit accommodating space (the hollow part 78), an electric wire, a cable or the shielded electric wire 81 as a remaining circuit is inserted.

(6) In the wire harness 9, 51, 71, 71', the circuit including the metallic tube body (the negative-electrode conductor 20, the metallic tube body 58, 61, 76) is a high-voltage circuit.

(7) In the wire harness 9, 51, 71, 71', the metallic tube body (the negative-electrode conductor 20, the metallic tube body 58, 61, 76) and the insulator (the second insulator 21, the insulator 59, 62, 77) are formed so as to have length extended from the end 24 of the exterior member 16. Thus, the end of the metallic tube body is exposed to form the electrically connecting part 29 in the end.

(8) In the wire harness 9, 51, 71, 71', the exterior member 16 is made of metal.

(9) In the wire harness 9, 51, 71, 71', the exterior member 16 may be made of resin.

(10) The method for manufacturing the wire harness of the embodiments is the method for manufacturing the wire harness 9, 51, 71, 71' including the plurality of circuits (the high-voltage coaxial compound electric conductive path 15 (specifically, the outer circuit 26 and the high-voltage electric wire 19), the high-voltage coaxial compound conductive path 52 (specifically, the outer circuit 53, the inner circuits 54 and 55)) and the tube body shaped exterior member 16 which accommodates the plurality of circuits, and the outermost circuit of the plurality of circuits (the outer circuit 26, 53, 72) including the metallic tube body (the negative-electrode conductor 20, the metallic tube body 58, 61, 76) and the insulator provided in the outer periphery side of the metallic tube body (the second insulator 21, the insulator 59, 62, 77). The method for manufacturing the wire harness of the embodiments includes the process in which the metallic tube body is expanded in the exterior member to be the expanded state, so that the outer surface of the insulator is allowed to come into close contact with the inner surface of the exterior member.

The methods for manufacturing the wire harnesses according to the embodiments of the present invention are useful from the viewpoints that the heat radiation can be improved and the diameter of the exterior member can be reduced.

What is claimed is:

1. A method for manufacturing a wire harness including a plurality of circuits and a tube body shaped exterior member which accommodates the plurality of circuits, wherein an outermost circuit of the plurality of circuits includes a metallic tube body and an insulator provided in an outer periphery side of the metallic tube body, the method comprising:
   a process in which the metallic tube body is expanded in the tube body shaped exterior member to be in an expanded state, so that an outer surface of the insulator comes into close contact with an inner surface of the tube body shaped exterior member,
   wherein expanding the metallic tube body in the tube body shaped exterior member includes:
      inserting the metallic tube body, in an unexpanded state, into the tube body shaped exterior member to an inserted longitudinal position relative to the tube body shaped exterior member, and
      after insertion to the inserted longitudinal position, expanding, while the metallic tube body remains at the inserted longitudinal position within the tube body shaped exterior member, the metallic tube body to the expanded state, wherein a radius of an interior hollow portion of the metallic tube body is greater in the expanded state than in the unexpanded state.

2. The method of claim 1, wherein each of the plurality of circuits includes a circular cross-section, the circular cross-sections of the plurality of circuits being concentric.

3. The method of claim 1, wherein the outermost circuit including the metallic tube body is a high-voltage circuit.

4. The method of claim 1, wherein the metallic tube body and the insulator have a length extending from an end of the tube body shaped exterior member and an end of the metallic tube body is exposed to form an electrically connecting part.

5. The method of claim 1, wherein the tube body shaped exterior member is formed of metal.

6. The method of claim 1, wherein the tube body shaped exterior member is formed of resin.

7. The method of claim 1, further comprising inserting another circuit of the plurality of circuits into the metallic tube body after the metallic tube body has been expanded to the expanded state.

8. The method of claim 1, wherein an inner surface of the outermost circuit of the plurality of circuits surrounds an outermost surface of another circuit of the plurality of circuits.

* * * * *